Feb. 23, 1932.  H. R. McLEOD ET AL  1,846,975
CULTIVATOR
Filed Nov. 15, 1928   2 Sheets-Sheet 1
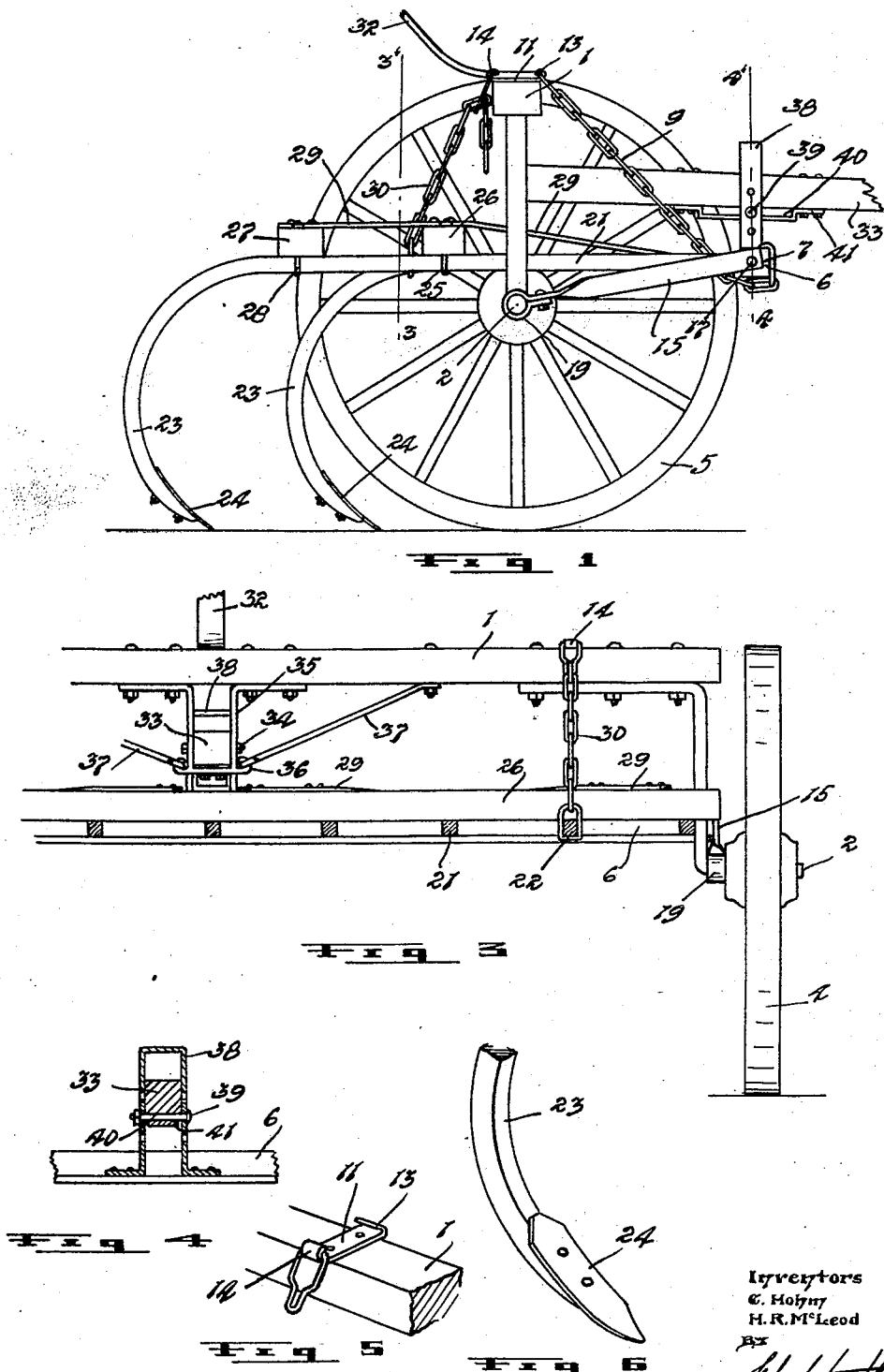

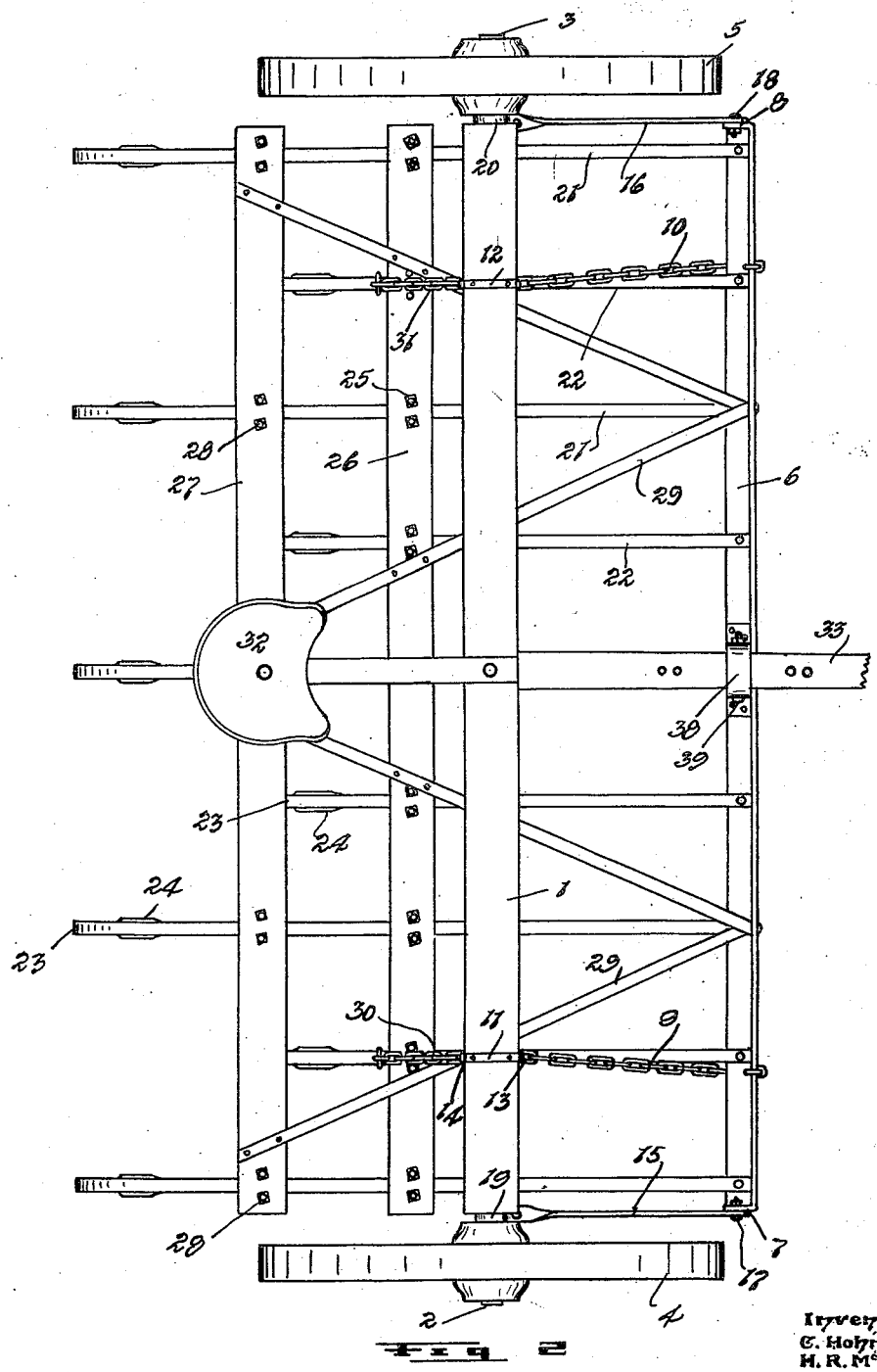

Patented Feb. 23, 1932

1,846,975

UNITED STATES PATENT OFFICE

HENRY R. McLEOD AND CARL HOHM, OF LESLIEVILLE, ALBERTA, CANADA

CULTIVATOR

Application filed November 15, 1928, Serial No. 319,618, and in Canada October 8, 1928.

The invention relates to improvements in cultivators and an object of the invention is to provide a cultivator which will effectively uproot quack grass and other undesirable ground roots, and which is arranged so that the uprooted roots will not gather on the cultivating shanks but clear the same and also so that all trash will clear, thereby avoiding clogging of the machine.

A further object of the invention is to construct the machine in a simple, durable and inexpensive manner and such that the depth of cut of the cultivator points can be readily adjusted by the operator or attendant.

With the above more important and other minor objects in view which will become more apparent as the description proceeds, the invention consists essentially in the arrangement and construction of parts hereinafter more particularly described, reference being had to the accompanying drawings, in which:—

Fig. 1 is an end view of the machine.
Fig. 2 is a plan view thereof.
Fig. 3 is a vertical sectional view at 3—3' Figure 1.
Figure 4 is a vertical sectional view at 4—4' Figure 1.
Fig. 5 is a perspective view of a portion of the main beam showing one of the double hooked catches.
Fig. 6 is a perspective view showing a portion of one of the shanks and the attached cultivating blade.

In the drawings like characters of reference indicate corresponding parts in the several figures.

The main beam 1 of the machine is elevated and has permanently connected to the ends thereof drop axles 2 and 3 on which the ground wheels 4 and 5 are rotatably mounted. Forwardly we locate a front beam 6 herein shown as an angle iron having the vertical flange extending upwardly and the ends closed by end lugs 7 and 8. This front beam is adjustably suspended from the main beam by adjustable flexible connections herein shown as chains 9 and 10, the front ends of the chains being fastened to the front beam and the rear ends thereof being attached to catches 11 and 12 on the top side of the main beam. These catches are each in the form of a narrow plate bolted or otherwise fastened to the main beam and having the front and rear ends terminating in hooks 13 and 14 (see Figure 5) and the rear ends of the chains are connected to the hooks 13.

The front beam is held in place by end sway bars 15 and 16, the forward ends of the sway bars being fastened pivotally to the lugs 7 and 8 by bolts 17 and 18 and the rear ends thereof being formed into sleeves 19 and 20 pivotally receiving the axles. Obviously one can readily raise or lower the front beam by adjusting the chains.

To the vertical flange of the front beam, we connect permanently alternated sets of spaced long and short draw bars 21 and 22 which have their rear ends provided with semi-circular down turned shanks 23, to the lower ends of which we fasten as by bolting similar cultivator blades 24. One can obviously utilize various types of blades on the shanks by unbolting one set and substituting another.

The draw bars are all connected by U-bolts 25 to a cross beam 26 which overlies the draw bars. Rearwardly of the cross beam 26 we locate a further cross beam 27, which overlies the rear ends of the longer draw bars and is fastened thereto by U-bolts 28. Angularly disposed brace bars 29 are fastened to the cross beams and to the front beam 6.

Similar flexible connections adjustably support the rear ends of the draw bars from the main beam and such are herein shown as chains 30 and 31 having their lower ends fastened to selected draw bars and their upper ends attached to the rear hooks 14 hereinbefore described. Obviously by adjusting the latter chains one can raise or lower the draw bars and by so doing vary the depth at which the cultivating blades operate in the ground.

Centrally the main beam 1 carries a seat 32 for the operator. The tongue or pole 33 of the machine passes centrally over the front beam 6 and centrally under the main beam and has the rear end thereof pivotally mounted on a cross bolt 34 carried by a yoke shaped strap 35 secured to the under side of the main beam. The strap is provided with side hooks 36 and angularly disposed brace rods 37 extend between the hooks and the main beam as best shown in Figure 3.

A yoke shaped strap 38 is also fastened to the front beam 6 and receives the passing tongue, and the strap carries an adjusting bolt 39 underlying the tongue and received within a slot 40 formed by a bar 41 fastening to it but having the body part thereof spaced from the tongue. One can adjust the tongue by raising or lowering the bolt 39 as will be readily understood.

Obviously one can adjust the machine as desired by adjusting the chains and when the machine is in use the cultivating blades will effectively cultivate the soil and uproot quack grass and other such undesirable roots and leave the same lying on the ground surface. The blades are staggered and so spaced that the uprooted trash clears therebetween and the shape of the shanks is such that the uprooted roots do not cling to the same but clear free.

What we claim as our invention is:—

In a cultivator, a transversely extending elevated main beam having at the ends thereof drop axles provided with ground wheels, a front beam parallel to the main beam and in advance of the axles, long and short sets of spaced draw bars having their front ends permanently fastened to the front beam and their rear ends terminating in down curving shanks appearing in staggered relation, cultivating blades secured to the lower ends of the shanks, cross beams secured permanently to the draw bars, sets of hooks secured to the main beam, sway bars pivotally connecting the ends of the front beam to the axles, front and rear sets of adjusting chains secured permanently to the front beam and to one of the cross beams and having their free ends caught on the hooks, said chains permitting of the adjustment of the front beam and the cross beam in respect to the main beam by catching one or other of the respective chain links on the hooks, and a draft tongue pivotally attached to the main beam and adjustably connected to the front beam.

Signed at Leslieville this 20 day of August, 1928.

HENRY R. McLEOD.
CARL HOHM.